United States Patent Office 3,669,509
Patented June 13, 1972

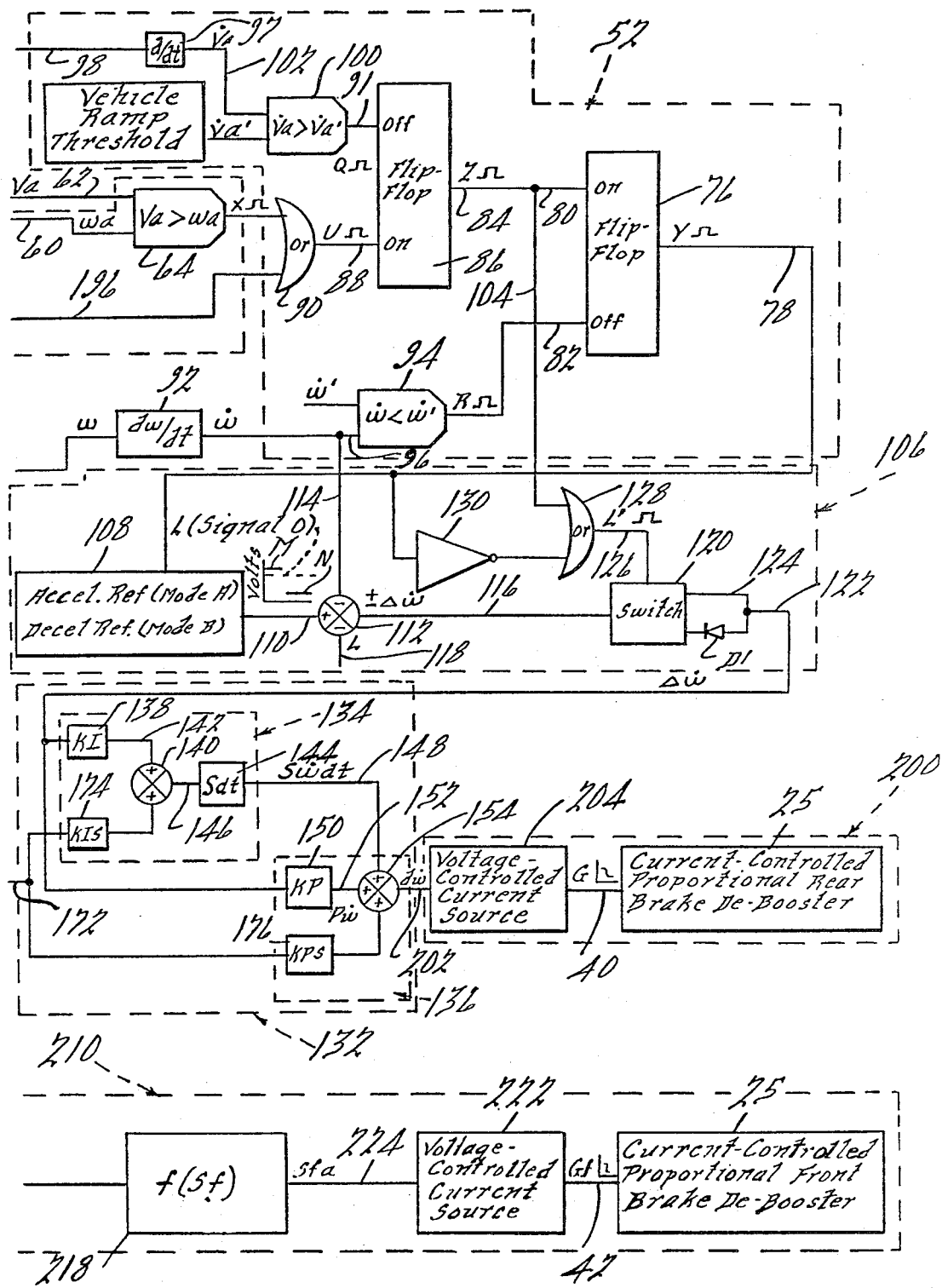

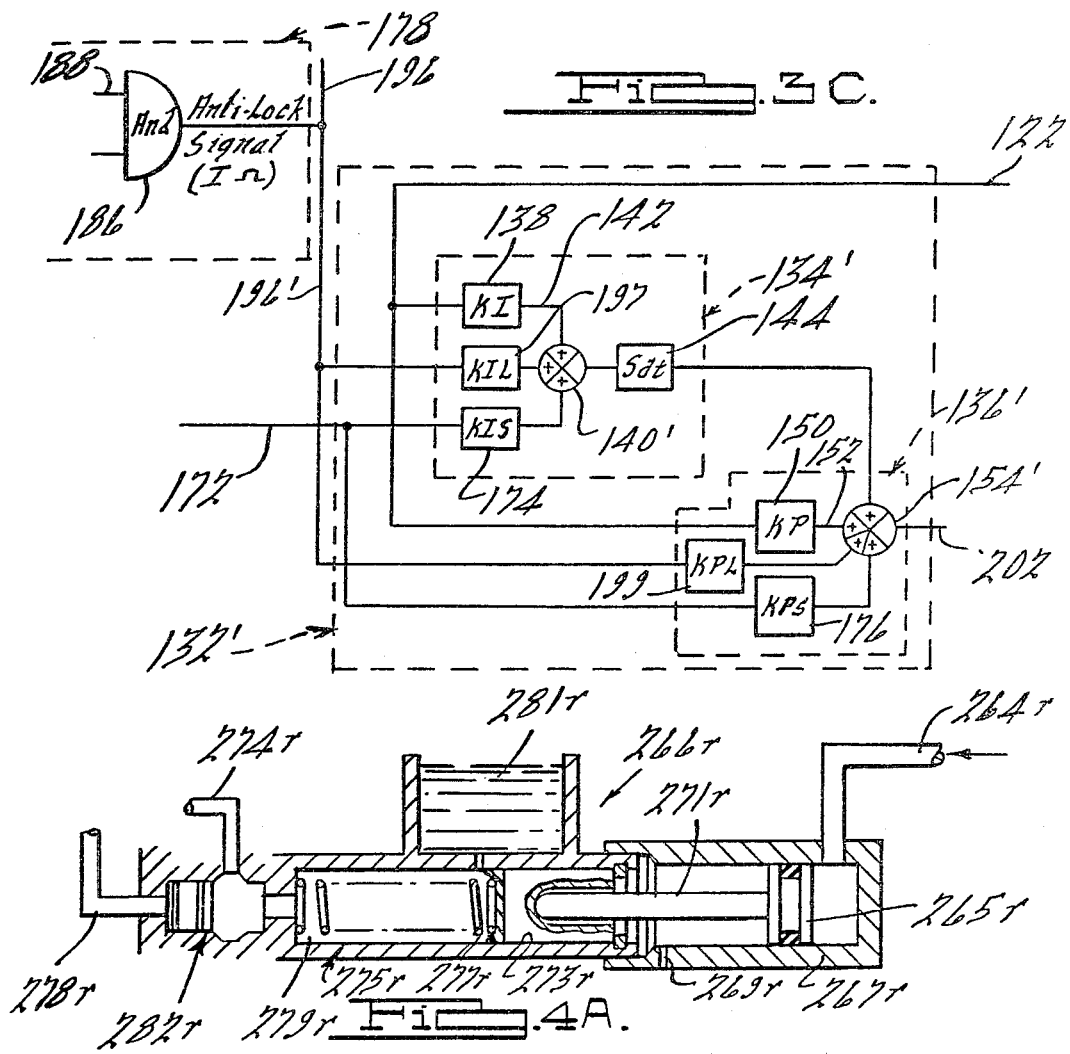

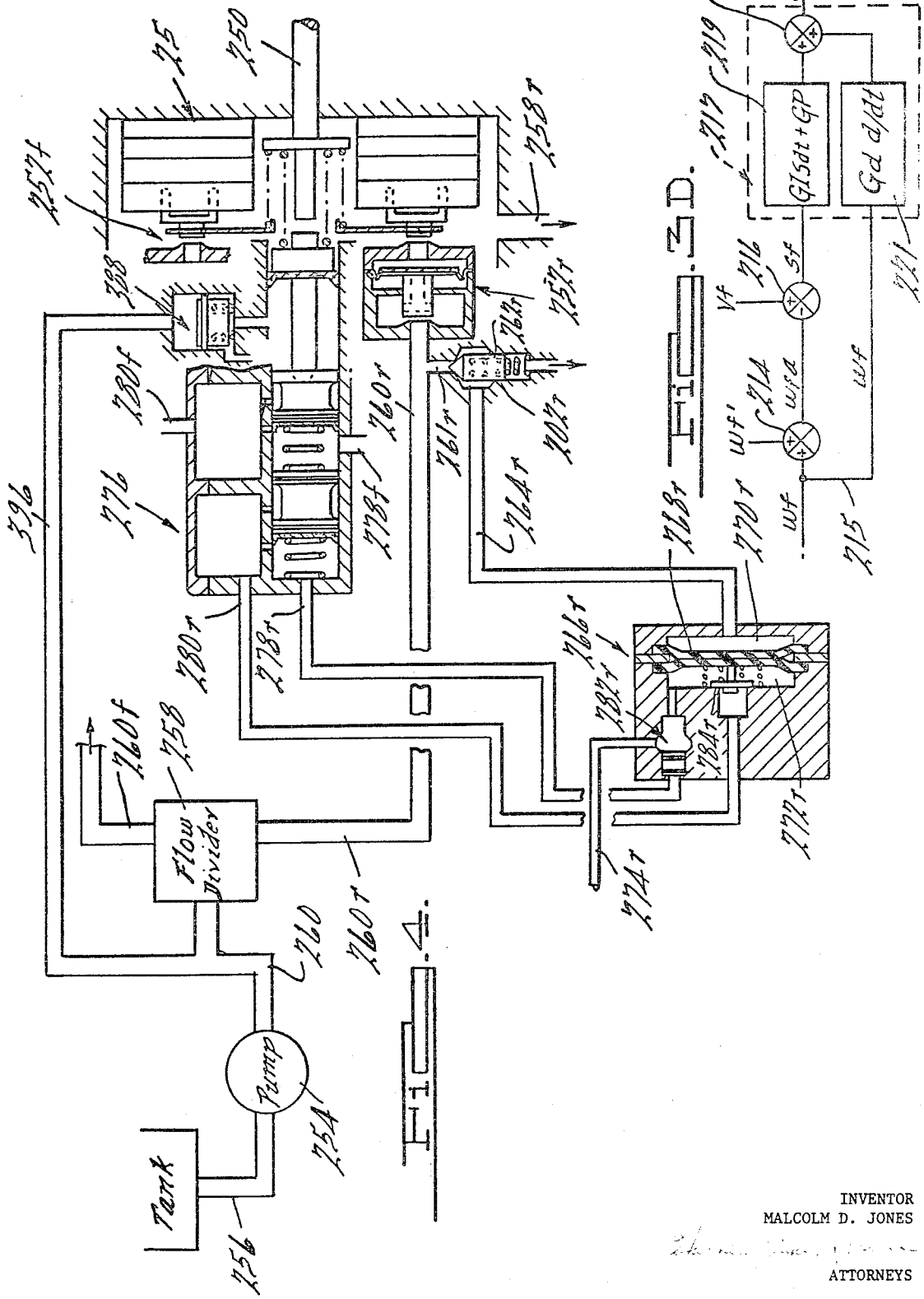

3,669,509
CONTROLLER FOR A SKID CONTROL SYSTEM
Malcolm D. Jones, Belleville, Mich., assignor to Kelsey-Hayes Company, Romulus, Mich.
Filed Aug. 3, 1970, Ser. No. 60,300
Int. Cl. B60t 8/08; F17d 1/14
U.S. Cl. 303—21 F
19 Claims

ABSTRACT OF THE DISCLOSURE

A hydraulic brake controller for a skid control system in which the controller uses hydraulic amplification and response generally proportionally to the magnitude of an error signal.

SUMMARY BACKGROUND OF THE INVENTION

The present invention relates to skid control systems and more particularly to a hydraulic brake controller for a skid control.

When the wheels of a vehicle are in an incipient skid condition, the braking torque or pressure is excessive and must be reduced in order to avoid a locked wheel condition. The pressure is varied by a valve system including a pilot valve receiving hydraulic pressure from the source of hydraulic power which is actuable by the vehicle operator and by an electromotive means responsive to the error signal to provide hydraulic pressure variations over a first predetermined range of pressures. The valve system further includes a main valve connected to the actuators for the brakes which is responsive to the first range of pressures from the pilot valve so as to provide hydraulic pressure variations over a greater range of pressures for operating the brakes. Generally in some skid control ssytems, the brake pressure is alternately relieved and re-applied to avoid a locked wheel condition. In these systems, however, while a locked wheel condition may be avoided resulting in good braking performance, still the stopping distance may not be optimized because of the extensive swings or variations in wheel speed during the control cycles, i.e. from near locked wheel to synchronous speed. In the present system the brake pressure is controlled such as to reduce the magnitude of the excursions of the wheel speed during skid control and to maintain the excursions of the wheel speed small and oscillating generally around a preselected magnitude of desired wheel speed during a brake stop; this speed generally, continuously decreases in magnitude during the brake stop. The present invention provides a brake controller which can be controlled to continuously modulate the brake pressure whereby the excursion of the wheel can be controlled. Therefore, it is an object of the present invention to provide a new and improved brake controller for use in a skid control system in which the wheel deviations during skid control are controlled and are maintained small in magnitude during braking. The controller in the present invention generally will provide brake pressure which is proportional to the input force as applied by the vehicle operator and can provide variations in brake pressure which are proportional to the magnitude of an input or control signal.

It is another general object of the present invention to provide a new and improved brake controller.

Other objects, features and advantages of the present invention will become apparent from the subsequent description and the appended claims, taken in conjunction with the accompanying drawings, in which:

Figure 2:
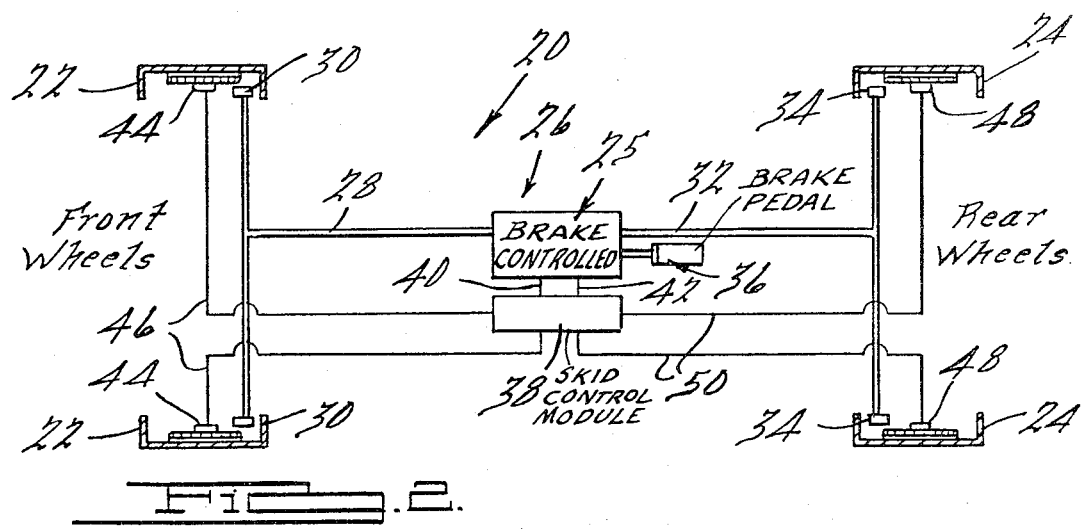
FIG. 2 is a general schematic of a vehicle with a skid control system embodying features of the present invention.
Figure 3A:
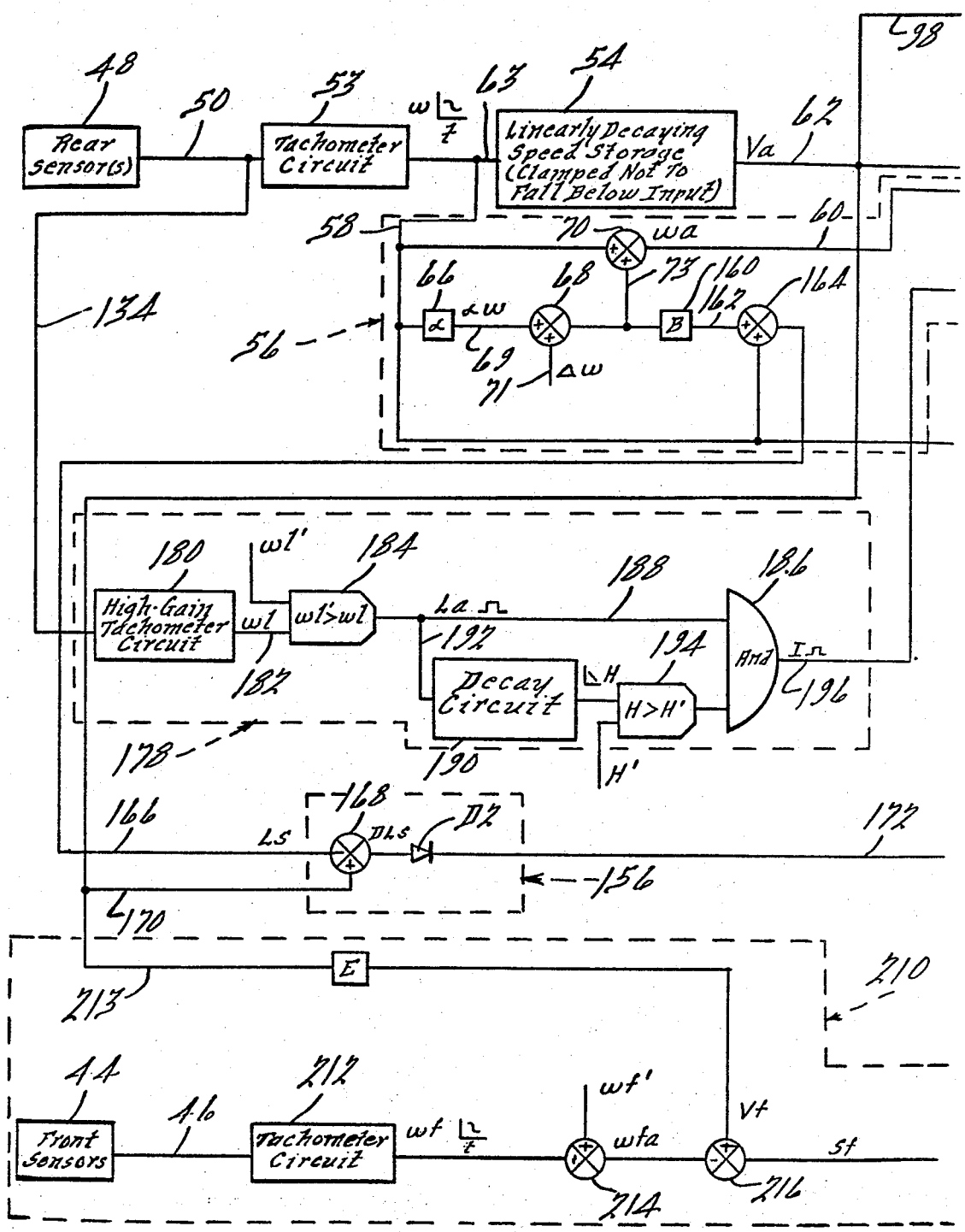
Figure 5:
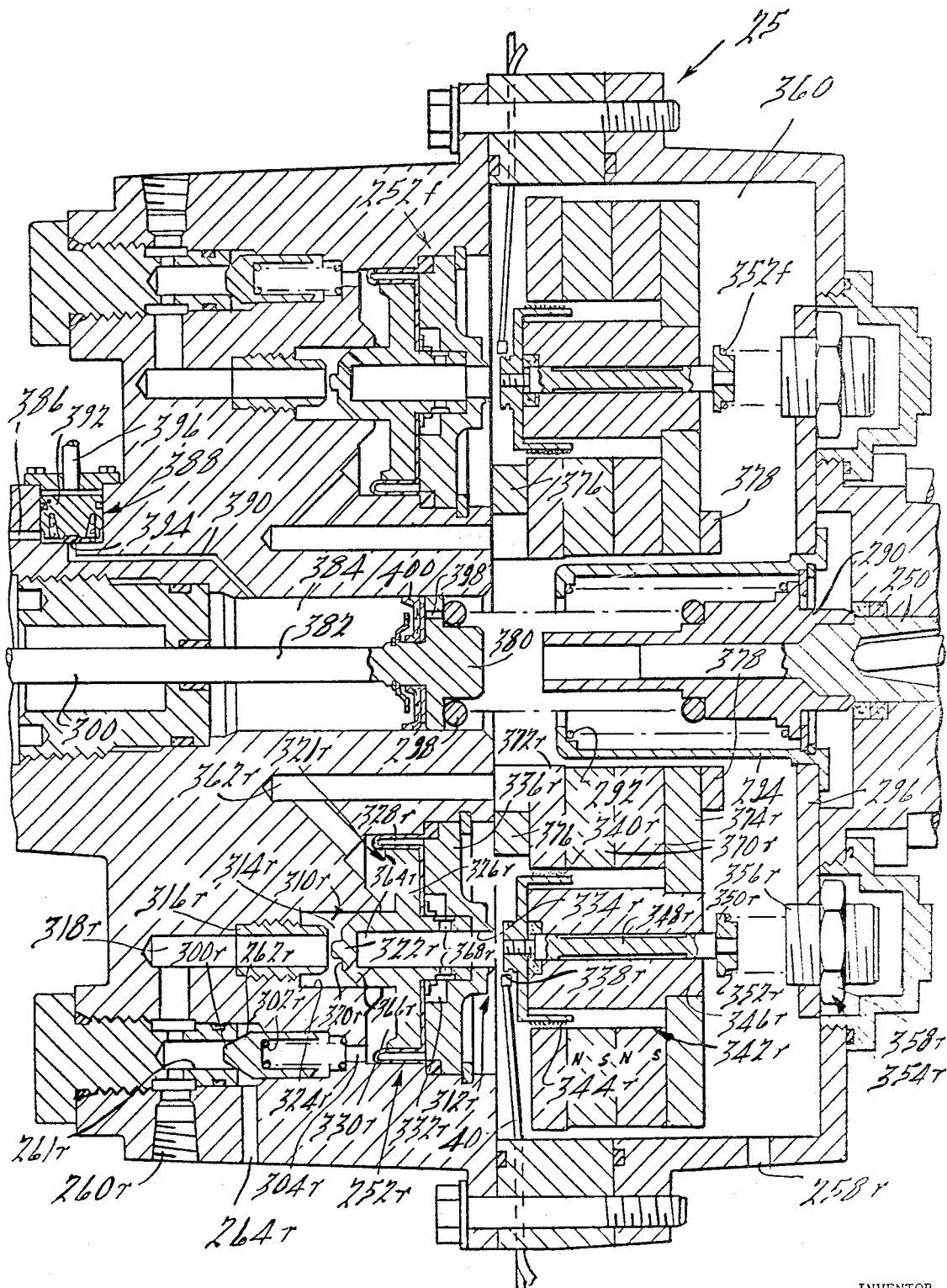

FIGS. 3A and B taken together depict block diagram for an electronic control circuit for controlling a hydraulically actuated brake system for the system of FIG. 2;

FIG. 3C is a modified form of a portion of the control circuit of FIGS. 3A and 3B;

FIG. 3D is a modified form of a different portion of the control circuit of FIGS. 3A and 3B;

FIG. 4 is a block diagram of the hydraulic system for the system of FIG. 2;

FIG. 4A is a modified form of fluid separator for the system of FIG. 4;

FIG. 5 is a side elevational view, with some parts shown in section, of the control valve of the system of FIG. 3.

Figure 1:
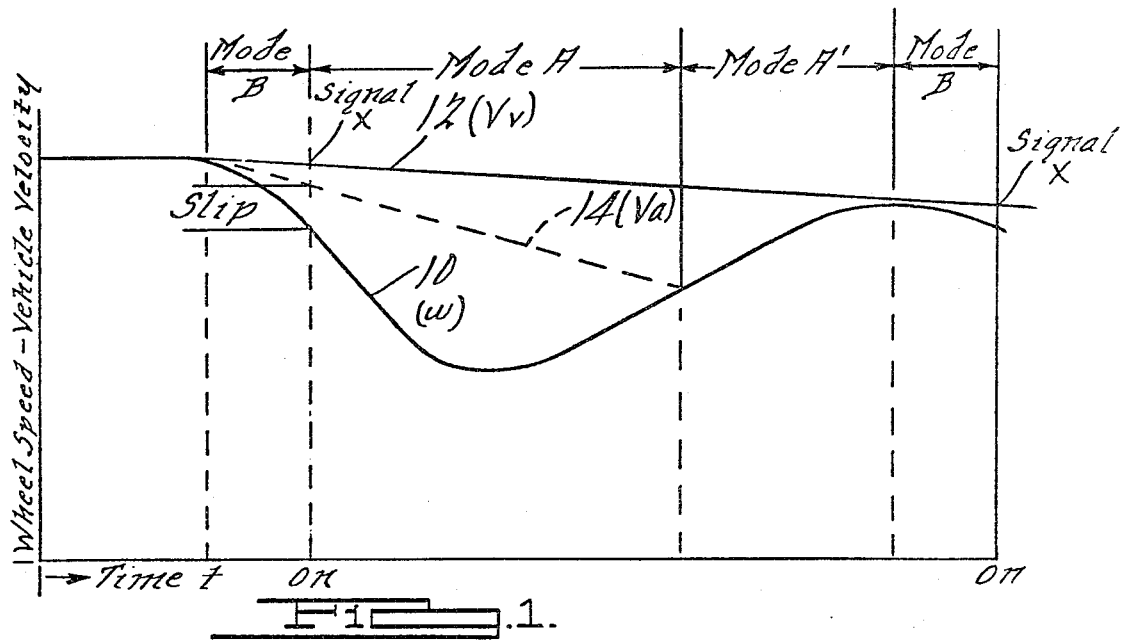
FIG. 1 is a curve showing wheel and vehicle speed versus time for exemplifying features of the present invention.

Looking now to FIG. 1, a curve 10 shows the relationship of wheel speed $w$ versus time $t$ and a curve 12 shows the actual vehicle speed $Vv$ versus time during a brake stop. Since actual speed cannot be conveniently measured directly the vehicle speed is simulated (by means to be described) and the simulated speed and measured wheel speed are utilized to determine slip. The simulated vehicle speed $Va$ is indicated by the curve 14.

The skid control system of the present invention has substantially two modes of operation referred to as modes A and B. The normal braking mode just prior to braking and during the initial stages of run down of the wheels during initial braking is shown as mode B. Upon the occurrence of an incipient skid condition a skid control signal occurs placing the system in mode A. The operation of modes A and B will be described generally and this will then be followed with a more detailed description.

In the present invention, the system continuously generates a wheel speed signal $w$ and a wheel acceleration or deceleration (depending on sign) signal $\overset{.}{w}$. This acceleration signal $\overset{.}{w}$ is continuously compared with a selected reference signal which is different for modes A and B. In an idealized brake system, braking would be maximized by maintaining the wheel at a speed providing a selected amount of slip relative to vehicle velocity. To accomplish this it is desirable to minimize the variation in wheel velocity from that velocity providing the desired amount of slip. Towards this objective then it is desirable to control wheel deceleration prior to the occurrence of an incipient skid condition so as to prevent excessive wheel decelerations which may result in the wheel running down too far from synchronous speed and too close to a locked wheel condition before controlled correction can be attained. For example in panic brake stops it is possible for the wheel to decelerate at a rate as high as 15–20g's on low mu surfaces and substantially less on high mu surfaces. An excessive deceleration of the wheel will tend to provide excessive wheel slip before controlled correction can occur. This, of course, prevents braking from being optimized. By limiting the deceleration rate at initial braking, the wheel velocity will be held closer to the desired wheel velocity at braking to provide the desired slip and hence less correction will be required. Thus in the present invention for an automotive application it was found desirable to limit wheel deceleration $-\overset{.}{w}$ at initial braking at around a 3–5g deceleration rate. Thus in mode B the system is present to control (relieve) brake pressure such that wheel deceleration should not exceed 5g's.

The system is selected to sense slip, i.e. vehicle velocity minus wheel velocity, and to determine when this attains a selected magnitude which is indicative of an incipient skid condition. When this occurs a skid control signal $x$ is generated indicating that additional brake control is required and the system is switched to mode A. While mode B controlled the initial wheel deceleration to prevent excessive deceleration and hence excessive run down, the mode A phase is designed to control spin-up rate.

In mode A a reference signal indicative of a 1g acceleration is used and is compared to the wheel acceleration (or deceleration) signal $w$. Initially in mode A the wheel is still decelerating and the measured rate is compared to the positive acceleration reference to provide a net error signal which will require a substantial decrease in brake pressure. Since the wheel deceleration has already been controlled in mode B, the amount of correction required in mode A need not be so extensive resulting in a controlled rapid decrease in magnitude of wheel deceleration. When the wheel begins to spin-up it is desirable to hold the spin-up rate to the relatively low magnitude of around 1g. Again where wheel spin-up is uncontrolled the wheel can under high mu conditions rapidly approach and reach synchronous speed and be at that speed for an excessive period of time before the re-application of pressure can be effective; this would preclude stopping distances from being optimized. Thus in the system of the present invention the spin-up rate is held to around 1g with the brake pressure modulated, i.e. increased to decreased, to maintain that acceleration rate in accordance with the magnitude of an error signal which is based upon the difference between the magnitude of acceleration and the selected 1g rate. Near the end of the cycle as wheel speed approaches synchronous, the acceleration tends to fall off; however, at this point and also to minimize running at synchronous the mode A phase of operation is clamped such that brake pressure cannot be decreased but only increased so that wheel acceleration is at 1g or less. The system of the present invention will at a preselected low magnitude of acceleration (less than 1g) switch back to original mode B; at this low magnitude of acceleration wheel speed is near synchronous. In mode B the —5g reference is again applied and with the wheel at some low magnitude of acceleration, the result will be a signal calling for an increase of brake pressure to decelerate the wheel towards the —5g level. The cycle repeats itself as long as the skid condition continues.

Looking now to FIG. 2 a vehicle 20 is shown to have a pair of front wheels 22 and a pair of rear wheels 24. A hydraulic brake system 26 has a fluid actuator 25 with a first fluid line 28 connected to front brake cylinders 30 and with a second fluid line 32 connected to rear brake cylinders 34. The fluid actuator 25 is actuated by the vehicle operator via a foot pedal and linkage assembly 36. The fluid actuator 25 can also be actuated to control the brake pressure to the fronts and rears in response to signals from a skid control electronic module 38 via conductors 40 and 42. The module 38 receives wheel speed signals from front wheel sensors 44 via conductors 46 and from rear wheel sensors 48 via conductors 50.

Looking now to FIGS. 3A and 3B, the module 38 is shown and receives the signal from the rear wheel sensors 48 via conductors 50. The signals are fed to a tachometer circuit 53 which integrates the signals to provide a D-C output signal $w$ the magnitude of which is indicative of the magnitude of the combined rear wheel speeds.

As previously noted the mode of operation, i.e. whether mode A or mode B, is significant to the operation of system and this is detected by mode circuit 52 which receives information from vehicle ramp circuit 54 and a slip threshold circuit 56. The wheel velocity signal $w$ is transmitted to the slip threshold circuit 56 via conductor 58. The circuit 56 utilizes the magnitude of wheel velocity signal $w$ to generate an adjusted threshold wheel velocity signal $wa$ which appears at conductor 60. The threshold signal $wa$ is compared to the simulated vehicle velocity signal $Va$ at conductor 62 via a comparator circuit 64 in the mode circuit 52 and when $Va$ exceeds $wa$ an output slip signal $x$ will be generated by circuit 64.

The simulated vehicle velocity signal $Va$ is derived from the wheel velocity signal $w$ which is transmitted to the ramp circuit 54 via conductor 63.

Vehicle ramp circuit 54

Circuit 54 can simply comprise a capacitor which normally is charged through a diode to a potential generally equal to that of wheel speed signal $w$ and hence will normally provide an indication of wheel speed. When no braking occurs this potential is also indicative of actual vehicle velocity $Vv$. The circuit 54 is provided with a discharge circuit having a time constant indicative of a selected vehicle deceleration rate. When the brakes are applied and the wheel speed signal $w$ drops below the magnitude of the charge on the capacitor, the capacitor will start to discharge at a selected rate and provide an output signal $Va$ which will have a magnitude approximating vehicle velocity. The ramp 54 will be reset each time the wheels spin-up to provide a signal $w$ to have a magnitude greater than the charge in the capacitor or greater than simulated signal $Va$. To assure resetting the discharge rate of the capacitor is selected to simulate a deceleration rate greater than the maximum attainable; thus simulated vehicle velocity $Va$ will always be less than actual vehicle velocity $Vv$.

During braking, there is a certain amount of slip and in normal braking the slip is not excessive; it is excessive when an incipient skid condition occurs which should be corrected by relieving brake pressure in order to avoid a locked wheel condition. This factor is determined and is used in the present system in a manner to be seen.

Slip threshold circuit 56

The wheel velocity $w$ at conductor 58 is multiplied by a factor $\alpha$ at voltage divider circuit 66 to provide a signal $\alpha w$ which is a fixed percent of $w$ and which is connected to addition circuit 68 via conductor 69. To the signal $\alpha w$ a fixed amount of slip $w$ is added to addition circuit 68 via conductor 71. This combined signal $(\alpha w + \Delta w)$ is added via conductor 73 to wheel velocity signal $w$ at addition circuit 70. Note that the slip threshold signal $wa$ then equals wheel speed $w$ plus the fixed slip $\Delta w$ plus a variable slip quantity $\alpha w$. This total $wa$ is compared to the simulated vehicle velocity $Va$ and when $Va$ exceeds $wa$ it will mean that $Va$ exceeds wheel speed $w$ by the sum of $(\alpha w + \Delta w)$ and that sum is selected as indicative of excessive slip which occurs in an incipient skid condition. The sum of $(\alpha w + \Delta w)$ will vary with wheel speed such that the slip signal $x$ will be generated at higher wheel speeds $w$ for higher vehicle velocities $Va$ and at lower wheel speeds $w$ for lower vehicle velocities $Va$; this also assures that at low vehicle speeds (when $w$ max and $\alpha w$ will be small) that the fixed slip signal $\Delta w$ will be of sufficient magnitude to provide the desired slip threshold $wa$. The slip signal $x$ is a logical "1" when circuit 64 is "on" (i.e. excessive slip detected) and a logical "0" when circuit 64 is "off" (i.e. slip not excessive).

As previously noted the slip signal $x$ is used to control the condition of the mode circuit 52 and when signal $x$ occurs the mode circuit 52 will be switched from B (initial braking) to mode A (incipient skid).

Mode circuit 52

As previously discussed, the brake control system has two modes, mode A and mode B and in each mode a different acceleration or deceleration reference; at the same time the brake pressure is modulated in accordance with the magnitude of an error signal based upon the magnitude of the difference between wheel deceleration and the acceleration or deceleration references.

The mode circuit 52 includes a final flip-flop circuit 76 which provides an output signal Y at output conductor 78 which is a logical "1" in mode A and a logical "0" when in mode B. The flip-flop 76 has an "on" input 80 and an "off" input 82 and the "on" input being an overriding input which will control in the event signals simultaneously occur at inputs 80 and 82. The overriding input 80 receives its signal Z from the output 84 of an intermediate flip-flop circuit 86. The signal Z is a logical "1" when flip-flop 86 in in mode A and "0" when in mode B. The use of a pair of flip-flops 76 and 86, as will be understood from subsequent description, is to permit the control circuit to be placed in a modified form of the mode A operation; this modified form is designated mode A' and will be later described.

The intermediate flip-flop 86 has an overriding "on" input 88 and an "off" input 91. While the intermediate flip-flop 86 is used to control final flip-flop 76 (via signal Z), its primary purpose is to detect and signal when mode A' is to occur.

The input 88 is actuated via a signal U from the output of an OR circuit 90 which has two inputs one of which is connected to the comparator circuit 64 to receive the slip signal $x$. The flip-flop 86 will normally be "off" or in the B mode and will be switched "on" or to the A mode when slip is excessive, i.e. $Va$ exceeds $wa$, and signal $x$ is a logical "1." The flip-flop 76 will also normally be "off" or in the B mode and will be switched "on" or to the A mode in response to signal Z being a logical "1."

In accordance with the prior discussion, the system will be in the A mode (or A' mode) to control spin-up and will remain on that mode until the wheel acceleration $\dot{w}$ reaches a selected minimum value indicative of a condition at which the wheels are approaching synchronous. Thus the wheel speed signal $w$ at conductor 58 is connected to the input of a differentiating circuit 92, which will provide an output signal $\dot{w}$ which is an indication of the acceleration of the wheel. This signal $\dot{w}$ is transmitted to a comparator circuit 94 via conductor 96 and there is compared to a selected threshold $\dot{w}'$ which is representative of the minimum acceleration referred to. When $\dot{w}$ decreases below $\dot{w}'$ when comparator circuit 94 will be actuated to generate the turn off signal R, which is transmitted to the "off" input 82 of flip-flop 76. Assuming no signal Z at "on" input 80, then signal R will switch flip-flop 82 to its "off" condition placing it back into the B mode.

Some mention should be made of the mode A', and the curves of FIG. 1 should be referred to. With the system in mode A the brake pressure is modulated to maintain wheel acceleration at around $1g$. When, however, the simulated vehicle speed $Va$ ramp curve 14 intersects the wheel speed $w$, curve 10 the slip signal $x$ will no longer be generated since it will have been terminated slightly earlier when wheel speed $w$ and slip threshold exceeded the vehicle speed $Va$. In this region it is desirable to hold the wheel acceleration to $1g$ or less but not permit acceleration to exceed $1g$. In doing this the wheels are controlled so that the time at which they are near synchronous speed is minimized. This is done by permitting error signals to be generated which will provide only holding of brake pressure or increases in brake pressure. It is significant to good brake control that the point of intersection be located accurately. This can be done by differentiating the simulated vehicle speed signal $Va$. From FIG. 1 it can be seen that the curve 14 decreases in magnitude at a relatively uniform slow, rate until it intersects the wheel speed curve 10 and at that point curve 14 and curve 10 are the same and hence curve 14 now increases with time. A differentiator circuit 97 receives the vehicle velocity signal $Va$ via conductor 98 connected to ramp section 54 via conductor 62. Circuit 97 will provide an output $\dot{Va}$ only in response to derivatives of decreases in vehicle velocity $Va$. The derivative signal $\dot{Va}$ is fed to a comparator 100 via conductor 102 and compared to a threshold $\dot{Va}'$ and when $\dot{Va}$ exceeds (is less negative than) $\dot{Va}'$ then an off signal Q will be transmitted to "off" input 90 of flip-flop 86 switching flip-flop 86 off. In this condition flip-flop 86 will be in its condition for the B mode and flip-flop 76 will be in its condition for the A mode and in that situation the mode A' exists and will be utilized in a manner to be described.

Looking to the mode circuit 52, two output conductors, 78 from flip-flop 76 and 104 from flip-flop 86 via conductor 84, exist. Thus, for mode A the Y and Z signals will appear at conductors 78 and 104, respectively; for mode B neither the Y or Z signal will appear; and for mode A' the Y signal will appear at conductor 78 while the Z signal will not appear at conductor 104. The above logic signals from the mode circuit 52 are used to control the acceleration and deceleration references used in the generation of the error signal and hence these signals are connected to the error signal gnerator circuit 106.

Error signal generator 106

The output signal Y is transmitted to the input of reference signal generator 108 which has an output conductor 110. The reference generator 108 will provide an acceleration reference output signal M having a magnitude selected to be representative of a $1g$ acceleration rate in response to the signal Y appearing at conductor 78. The generator will provide a deceleration reference, output signal N having a magnitude selected to be representative of a $-5g$ deceleration rate in response to the signal Y not appearing, i.e. a logical 0, at conductor 78. An error signal $\Delta \dot{w}$ is generated by subtracting the wheel deceleration (or acceleration) $\dot{w}$ from the reference signal M or N. Thus a subtracting circuit 112 receives the reference signal (M or N) from reference generator 108 via conductor 110 and the wheel deceleration (acceleration) signal $\dot{w}$ from differentiator circuit 92 via conductor 114 and provides the error signal $\Delta \dot{w}$ at its output conductor 116. As will be seen a negative error signal ($-\Delta \dot{w}$) will result in an increase in brake pressure and a positive error signal ($+\Delta \dot{w}$) will result in a decrease in brake pressure.

The error signal $\Delta \dot{w}$ is transmitted to mode A' selector circuit 120 via conductor 116. Selector 120 is normally in a condition to transmit the error signal $\Delta \dot{w}$ directly to output conductor 122 via conductor 124. However, in mode A', selector 120 is actuated to switch the output signal $\Delta \dot{w}$ to output conductor 122 via diode D1. Diode D1 will permit only negative magnitudes of $\Delta \dot{w}$ to be transmitted and hence, in accordance with the prior descrption, mode A' will control such that only increases in brake pressure can occur. The mode A' selector is actuated by a signal L' at conductor 126 from OR circuit 128. OR circuit 128 has one input connected to conductor 104 (from flip-flop 86) and its other input connected to conductor 78 (from flip-flop 86) via invertor circuit 130. In either the A or B modes OR circuit 128 will be actuated to generate the L' signal and to hold A' mode selector in its normal condition, i.e. circuit of conductor 124 actuated; in the A' mode the OR circuit 128 will not be actuated and L' signal will not appear, i.e. at logic "0", and circuit 120 will be switched to its A' mode, i.e. circuit of diode D1 actuated. The output error signal $\Delta \dot{w}$ at conductor 122 will be transmitted to the proportional controller circuit 132 which provides the final output signal to control the brake controller or actuator 25.

Note that in mode B the vehicle wheels will be decelerating and this wheel deceleration will be compared with the $-5g$ deceleration reference to provide the error signal $\Delta \dot{w}$. Before the wheel begins to accelerate, the mode circuit 106 will be switched to the A mode which has a $+1g$ reference; initially in the A mode, however, the wheels will still be decelerating. This will result in a larger $\Delta \dot{w}$ indicating that substantial relief in brake pressure is required; in other words, the difference in sign between wheel deceleration and acceleration reference is taken into account and will result in the large $\Delta \dot{w}$. As the wheel begins spin-up then $\Delta \dot{w}$ can decrease and may even change sign if the $+1g$ acceleration is exceeded. To complete the cycle, the mode A' operation permits only holding of or increases of brake pressure to hold spin-up to $1g$ or less after the slip signal $x$ is gone; and finally when the acceleration of the wheels drops below a selected minimum ($\dot{w}'$) then the mode circuit is again switched to its mode B operation.

Proportional controller circuit 132

This circuit 132 has an integrating circuit 134 and a proportional circuit 136. The error signal $\Delta \dot{w}$ is acted upon by both of these circuits to provide the final error signal $d\dot{w}$. The integrating circuit 134 provides a signal $\int \dot{w}dt$ which represents the magnitude of correction over a selected time period required to bring the brake pressure to provide the desired (reference) acceleration or deceleration and when the wheel deceleration (acceleration) is at the desired magnitude the integral signal $\int \dot{w}dt$ will represent the change required from the brake pressure established by the vehicle operator to maintain the reference acceleration or deceleration. Until, however, this desired magnitude is obtained the integral signal $\int \dot{w}dt$ will be supplemented by a proportional signal $p\dot{w}$. This provides an instantaneous indication of the magnitude of the correction still required to attain the desired wheel deceleration (acceleration). When this acceleration (deceleration) has been attained then the proportional signal $p\dot{w}$ will be zero and at this time the final output signal $d\dot{w}$ will equal the integral signal $\int \dot{w}dt$. By varying the ratio of proportional signal $p\dot{w}$ to integral signal $\int \dot{w}dt$ lead time can be built into the system to accommodate the lag of various electrical and mechanical components of the system.

Looking now to integrator circuit 134, error signal $\Delta \dot{w}$ is multiplied by a selected constant KI at multiplier 138 and the product is transmitted to add circuit 140 via conductor 142. The output from add circuit 140 is integrated by integrator 144 (via conductor 146) to provide integrator output $\int \dot{w}dt$ at conductor 148. At the same time error signal $\Delta \dot{w}$ is transmitted to proportional circuit 150 where it is multiplied by a selected constant KP to provide the proportional signal $p\dot{w}$ at conductor 152. The signals $\int \dot{w}dt$ and $p\dot{w}$ are transmitted via conductors 148 and 152 to summing circuit 154 where the two signals are added to provide the final output signal $d\dot{w}$. The integrated signal $\int \dot{w}dt$ and proportional signal $p\dot{w}$ will vary in magnitude relative to each other and under some conditions can be equal; the relative proportions of each can be varied to accommodate different requirements for different vehicles.

For a given deviation between desired and actual wheel acceleration or deceleration it may be that there still exists a large wheel slip; in this condition a more rapid correction would be desired. This situation is detected by the large slip detector circuit 156.

Large slip detector circuit 156

This circuit operates in conjunction with the slip circuit 56 and the two should be considered together. In slip circuit 56, the output from summing circuit 68 is transmitted via conductor 158 to multiplier 160 where the slip signal is multiplied by a factor B (which is greater than unity). The multiplied slip signal is transmitted via conductor 162 to a summing circuit 164 and is added there to the wheel speed signal $w$. This slip signal LS is transmitted via conductor 166 to large slip detector 156. Detector 156 has a subtraction circuit 168 which receives signal LS via conductor 166 and subtracts it from the simulated vehicle ramp $Va$ which it receives via conductor 170. The output $D_{LS}$ is transmitted to the proportional controller circuit 132 via diode D2 and conductor 172. The signal $D_{LS}$ is multiplied by a factor KIS by multiplier 174 in integrating circuit 134 and the multiplied output is added to the output of error signal multiplier 138 by summing circuit 140 such that the output signal $\int \dot{w}dt$ will reflect, when the large slip condition exists, the effect of large slip signal $D_{LS}$.

At the same time the large slip signal $D_{LS}$ is multiplied by proportional multiplier 176 by a factor KPS and the multiplied output is added to the output of error signal multiplier 150 and to the output signal $\int \dot{w}dt$ by summing circuit 154 such that the final output signal $d\dot{w}$ will reflect the effect of the large slip signal $D_{LS}$.

At lower vehicle and wheel velocities, the wheel may be approaching locked wheel and yet the wheel slip may not be sufficient to provide the slip signal $x$. To optimize stopping it would still be desirable to prevent lock up. This is accomplished by the anti-lock circuit 178.

Anti-lock circuit 178

Since this circuit is utilized generally for lower vehicle and wheel speeds a high gain tachometer circuit 180, which receives wheel speed information from sensors 50 via line 184, is used to provide a wheel speed signal $wl$ at its output line 182. The signal $wl$ is fed to a comparator circuit 184 where it is compared to a threshold $wl'$; when $wl'$ exceeds $wl$ an output signal $La$ is generated and transmitted to an AND circuit 186 via line 188. The AND circuit, however, to provide an anti-lock signal must also receive an input from a time out circuit 190 which begins to time out and provide a decaying signal H in response to the signal L at its input 192. The signal H is fed to a comparator circuit 194 and compared to a small threshold signal H' and as long as H is greater than H', comparator 194 will provide an input to AND circuit 186. The time out provision is provided to prevent the occurrence of an anti-lock signal for an indefinite period. The AND circuit 186 will provide anti-lock signal I at its output conductor 196 to OR circuit 90 in mode circuit 52. This will result in signal U being generated by OR circuit 90 causing flip-flop 86 and flip-flop 76 being placed in the A mode.

A modified form of the invention is shown in FIG. 3C; it may be desirable in some systems that, in the event the wheels are tending to lock up, the error signal $\Delta \dot{w}$ to the proportional controller circuit 132 be increased in order that brake pressure can be quickly relieved to an ever greater extent to prevent lock up. Thus in FIG. 3C the anti-lock circuit 178 has a second output conductor 196' connected to conductor 196 and to the proportional controller circuit 132. Now the signal I from AND circuit 186 is transmitted to integrating circuit 134' and multiplied by a constant KIL at multiplier 197 with the resultant output added to the outputs from multipliers 138 and 174 at addition circuit 140'. At the same time the signal I is transmitted to proportional circuit 136' and multiplied by a constant KPL at multiplier 199 with the resultant output added to the other inputs to addition circuit 154'. The signal I will have a fixed amplitude (when at logical 1) and hence will add to the integrating circuit 134 and proportional circuit 136 a fixed amount which is selected to initially provide a large addition to the amplitude of the final error signal $d\dot{w}$. The result will be a large decrease in brake pressure to prevent wheel lock up.

Final output circuit 200

The final output signal $d\dot{w}$ from proportional controller circuit 132 is transmitted to a final output circuit 200 via line 202. Signal $d\dot{w}$ is a varying voltage which is converted to a variable current via a voltage controlled current source 204. The resultant variable current signal G is transmitted to the brake controller 25 via conductor 40. Note that while the controller 25 is a proportional controller other types of brake control apparatus could be utilized for providing control based upon the final output signal $d\dot{w}$.

Front wheel control circuit 210

With the rear wheels 24 being controlled in the manner described the front wheels 22 can be controlled utilizing a substantially simplified circuit 210.

In circuit 210 the front wheel sensors 44 transmit front wheel speed signal to a tachometer circuit 212 via conductor 46. The tachometer circuit 212 provides a D-C output signal $wf$, having an amplitude which is indicative of the front wheel speed. The signal $wf$ is added to a fixed speed offset signal $wf'$ via summing circuit 214 to provide a threshold signal $wfa$. The offset signal $wf'$ is selected as indicative of the difference between vehicle and front wheel speed at which excessive front wheel slip has occurred. Thus the threshold signal $wfa$ is subtracted from a simulated vehicle speed $Vf$ by a difference circuit 216. The vehicle speed signal $Vf$ is derived from the simulated vehicle ramp signal $Va$ generated by the rear wheel circuit 54. The signal $Va$ transmitted to front wheel control circuit 210 via conductor 218 is modified by factor E to provide the signal $Vf$. The front wheels are controlled utilizing slip only and hence the error signal for the front wheels will be the slip signal $Sf$ from difference circuit 216 and the front wheels will be controlled in accordance with the magnitude of the slip signal $Sf$. This is done by transmitting the slip signal $Sf$ to a proportional controlled circuit 218 via conductor 220. Circuit 218 is similar in function to the rear wheel circuit 132 and it will provide a final control signal $Sfa$ which will be a combination of a signal which is an integration of $Sf$, one which is proportional to $Sf$ and one which is a derivative of $Sf$. Again this is to provide memory for the total correction required and also to provide the necessary lead. The derivative component will be generally small in comparison to the other two components which under some conditions could be equal to each other.

The final signal $Sfa$ is transmitted to a voltage controlled current source 222 via conductor 224 and there a signal $Gf$ is generated which is a current proportional to the error signal $Sfa$. Again this signal is transmitted to brake controller 25 via conductor 42 to provide control for the front brakes.

Modified front wheel control circuit

In some applications it may be desirable to provide a different means for obtaining lead than that shown in FIG. 3B. FIG. 3D shows a modified system and includes a different proportional control circuit 217. Circuit 217 includes a first stage 219 which receives the slip signal $Sf$ and provides one component ($\int GI dt$) which is the integral of the signal $Sf$ and a second component (GP) which is proportional to the signal $Sf$. The sum of these components is transmitted to addition circuit 223. Note that the proportional component (GP) provides a lead function in accordance with a fixed ratio of signal $Sf$. It is desirable to have a lead varying with the rate of change of wheel speed. Thus, in FIG. 3D the front wheel speed signal $Wf$ is transmitted via line 215 to a second stage 221 in proportional control circuit 217. The stage 221 differentiates ($Gd\, d/dt$) the wheel speed signal $Wf$ to provide a derivative component which will vary in magnitude with the rate of change of $Wf$. The derivative component is added to the output from the first stage 219 at addition circuit 223 to provide the front wheel error signal $Gf$. The sign of the second stage 221 is negative; thus when the derivative of wheel speed $Wf$ is negative (indicative of deceleration) the output from second stage 221 will be inverted and will be positive. The result is that for wheel deceleration the error signal $Gf$ will be increased in magnitude and for acceleration it will be decreased in magnitude. In general the output from the second stage 221 will be small compared to that from the first stage 219. Also the integrated portion ($\int GI\, dt$) and proportional portion (GP) will vary relative to each other and under some conditions can be equal; however, the relative proportions of each can be varied to accommodate different requirements for different vehicles.

Hydraulic system

Looking now to FIG. 4, generally a block diagram of a hydraulic system capable of utilizing the control signals G and $Gf$ for controlling fluid pressure to the front and rear brakes is shown.

The brake controller 25 depicted generally diagrammatically is shown to be actuated via a rod 250 which is in turn actuated by the vehicle operator through a conventional foot pedal. The brake controller 25 has a control valve 252r for controlling fluid pressure to the rear brakes and 252f for the front brakes. The systems for the front and rear brake, are similar and hence only the system for the rear brakes will be described.

Generally actuation of the control valve 252r via the vehicle operator will provide actuation of the rear brakes; however, the control valve 252r will be responsive to the signal G from the control module 38. The control valve 252r controls the magnitude of fluid pressure from a source in one fluid circuit which in turn acts upon the brake fluid in separate fluid circuit to control braking.

Thus in FIG. 4 a fluid pump 254 provides fluid flow from a source 256 to a flow divider 258 via a fluid line 260. The flow divider 258 has a rear brake supply line 260r and a front line 260f for applying the rear and front brake control circuits, respectively. The flow divider 258 provides fluid flow at a substantially constant rate to each line 260r and 260f while permitting unequal pressure to each in accordance with the requirements demanded. The output line 260r is connected to the inlet of the control valve 252r. The outlet of valve 252r is connected to tank 256 via a return line 258r. The control valve 252r, in a manner to be seen, provides a restriction to the flow to tank line 258r and thereby controls the output pressure at output line 261r. Output line 261r has a hold-off valve 262r in series therewith, with valve 262r providing a hold-off up to a minimum pressure in order to prevent unwanted continual actuation of the rear brakes at the normal, quiescent operating pressure at line 261r. Upon actuation of brake controller 25 by the vehicle operator, the control valve 252r will be actuated to restrict flow to return line 258r resulting in an increase in pressure at output line 261r; this in turn will unseat hold-off valve 262r (which has one side connected to line 261r and the opposite side connected to tank) permitting line 264r to transmit the pressure at line 261r.

The line 264r is connected to a fluid separator 266r which has one side connected to the fluid system of pump 254 and its other side connected to the fluid system for the brakes. In general the fluid separator has a chamber divided by a diaphragm 268r with one side 270r connected to fluid line 264r for actuation by fluid from pump 256 and with the other side 272r connected to the rear brake line 274r and hence to the fluid system for the rear brakes. Thus, the pressure to rear brakes via line 274r will be controlled by the pressure applied in chamber portion 270r via control valve 252r.

The hydraulic system has a push through capability in the event of failure of the system of pump 254. Thus a dual master cylinder 276 has outlets 278f and 278r to the front and rear brakes, respectively and returns 280f and 280r to the front and rear brake reservoirs, respectively. The brake controller 25 is designed such that upon failure of the fluid system of pump 254 the rod 250 can be pushed through to actuate master cylinder 276 to provide braking in a conventional manner. A control valve 282r normally blocks output line 278r from master cylinder 276 while permitting communication between chamber portion 272r of fluid separator 266r and brake line 274r. However, upon loss of fluid pressure from pump 254 and the actuation of master cylinder 276 the valve 282r will be switched to block chamber portion 272r and connect master cylinder output line 278r to rear brake line 274r. The reservoir line 280r is connected to chamber portion 272r via a check valve 284r in the fluid separator 266r.

Brake controller 25

Details of the brake controller 25 are shown in FIG. 5. Thus the rod assembly 250 is connected to a flanged input cylinder assembly 290 which can move independently of and is spring coupled via a lightly biased spring 292 to a cup-shaped member 294 which has an outer flange connected to a generally flat actuating plate 296. A heavy spring 298 is connected between the cylinder assembly 290 and a push through rod 300 connected to the master cylinder assembly 276. The push through rod 300 is normally held from motion and hence the bias of the heavy spring 298 is selected to provide pedal "feel" to the vehicle operator.

The actuator 25 includes the control valves 252r and 252f which are identical and hence only 252r and its associated fluid circuitry wil be described. The line 260r from flow divider 258 is connected to fluid passage 261r to one side of hold-off valve 262r. Valve 262r has a conical valve member 300r held against a cooperating valve seat via spring 302r to normally hold passage 261r closed from communication with 264r until some low magnitude of pressure is generated by action of the vehicle operator. In one example valve 262r was designed to stay closed until a pressure of 50 p.s.i. was reached, thus preventing unwanted actuation of the vehicle brakes. The opposite side of valve member 300r is connected to tank via passage 304r and there is provided a slight clearance around member 300r to permit bleed back of fluid pressure in line 264r after actuation of the brakes has been terminated by the vehicle operator and after the pressure in line 261r has just dropped below the minimum pressure set, i.e. 50 p.s.i.

The pressure in line 261r and hence that delivered to output line 264r to the fluid separator 266r is dependent upon the actuation of control valve 252r. In general valve 252r is normally open to provide little pressure at line 261r. However, valve 252r as actuated provides a variable restriction such that flow therethrough can be controllably throttled. Since the fluid flow in the circuit will be generally at a constant rate, the result will be an increase in pressure at line 261r.

The control valve 252r includes a main valve and orifice assembly 310 r and a pilot valve and orifice assembly 312r. The main valve assembly 310r includes a variable orifice 314r defined by a fixed tube 316r in a passage 318r, which is, fluid connected with passage 260r, and a movable, co-operating restriction surface 320r on a main valve member 321r. Surface 320r is at the outer end of a nose portion 322r which is slidably supported in a bore 324 r. Nose portion 322r is connected with an enlarged flange portion 326r which is secured at its radially outer extremity to a flexible diaphragm 328r. The main valve member 321r is supported for axial motion via diaphragm 328r within a chamber and with the diaphragm 328r dividing that chamber in chamber portions 330r and 332r. As the main valve member 321r moves axially such that its restriction surface 320r moves toward or away from the tube 316r the restriction to fluid flow can be increased or decreased resulting in a corresponding increase or decrease in fluid pressure in passage 318r, and line 260r eventually resulting in corresponding variation in brake pressure via passage 261r, 264r, etc. The pressure acting on the main valve member 321r is controlled by the pilot valve and orifice assembly 312r.

The pilot valve assembly 312r includes a passage 334r which extends through a cap 336r which cap is utilized to close the downstream side of the chamber which houses the main valve member 326r. The pilot assembly 312r also includes a restriction surface 338r on a cup shaped spool member 340r which is supported, in a manner to be described, for axial movement relative to the passage 334r whereby the restriction surface 338r will vary the restriction to fluid now such that corresponding variations in pressure in passage 324r will occur.

The spool member 340r is a part of an electromagnetic force motor 342r and has an actuating coil 344r wound thereon which coil is energized via leads or conductors 40; thus the coil 344r will be energized via the signal from the voltage controlled current source 204 in a manner to be described.

The spool member 340r is supported for axial movement on a core member 346r via a spindle 348r which extends through a central bore in core 346r and is connected at one end to spool member 340r and terminates at its opposite end in an enlarged head portion 350r.

The spindle 348r is coupled to one end of the actuating plate 296 via a spring 352r which engages the head portion 350r at one end and a bias adjustment assembly 354r at its opposite end.

The bias assembly 354r is fixed to the actuating plate 296 and includes a threaded stud member 356r and locking nut 358r; the bias of the spring 352r on spindle 348r can be set by adjusting the extension of stud member 356r relative to the actuating plate 296. With no fluid flow, the spring 352r will urge the restriction surface 338r to close passage 334r. However, the low pressures present prior to brake actuation with a normal flow of fluid will be sufficient to move the spool 340r rearwardly to unseat the surface 338r.

The pilot valve assembly 312r is located in an enclosed chamber 360 which has its fluid inlet via the passage 334r and its outlet to tank via passage 258r. The main valve assembly 310r has its chamber portion 330r connected to tank via passage 362r and chamber 360. The main valve member 321r has a pair of fluid passages 364r and 366r which communicate the inlet bore 324r with outlet passage 334r. The outlet passage 334r is also fluid communicated with the chamber portion 332 of the main valve assembly 310r via ports 368r which are connected to path 364r. Thus the main valve member 321r has tank pressure on one side of flange portion 326r and the pressure in the passage 334r which is the pressure developed by the pilot valve assembly 312r via the action of restriction surface 338r on the other side. In this way small changes in pressure at passage 334r as caused by pilot valve assembly 312r will be hydraulically amplified, via movement of main valve member 321r to provide a larger change in pressure in tube 316r and hence in the pressure delivered to the fluid separator 266r and then applied to the rear brakes.

Normal brake operation

For normal brake operation by the vehicle operator the rod assembly 250 moves the actuating plate 296 with this motion being resisted by the pedal "feel" spring 298. This motion will be transmitted to the spool member 340r via the spindle 348r resulting in the restriction surface 338r being moved to vary the flow restriction from passage 334r; since the system uses a constant flow source, the result will be a change in pressure corresponding to the change in the restriction to flow. This change in pressure will be amplified by the main valve and orifice assembly 310r in the manner previously described.

Skid control operation

Skid control is provided by the electromagnetic force motor assembly 342r; this assembly includes a pair of annular, permanent magnets 370r polarized as indicated which are held between a pair of pole pieces 372r and 374r with the magnet assembly being positioned via nonmagnetic spacer rings 376r and 378. In a sense the spool 340r and coil 344r act like a voice coil and will move axially in response to the current applied to the coil 344r. In operation during controlled operation the current to the coil 344r via conductor 42 will have a magnitude varying in accordance with the magnitude of the error signal. This error signal current will cause the spool 340r to move to open the passageway 344r with a force generally proportional to the magnitude of the current. The result will be a corresponding change in the restriction, via restriction surface 338r, and hence a corresponding change in the pressure at passage 334r. This will result in corresponding modulation of pressure to the brakes.

Push through operation

As noted, normally the brake actuation occurs through the action of the control valve 252r; in the event, however, of failure of fluid supply or pump 254 the brakes can be manually actuated by a push through feature. Considering FIGS. 4 and 5, the fluid actautor 25 has the push through rod 300 which, when actuated, will cause actuation of the master cylinder 276 in a conventional manner. The rod 300 is actuated through the pedal "feel" spring 298. The rod 300 has a head portion 380 slidably supported in a sealed chamber 382 with its rod portion 384 extending through the chamber 382 and into the master cylinder 276. The chamber 382 is normally filled with fluid from the system of pump 254 and the fluid is trapped there and hence prevents movement of push through rod 300. The chamber 382 is connected to a fluid path 386 which is connected to tank 256 via a latch piston assembly 388. A passage 390 communicates the chamber 382 at one side of a differential piston 392 which has a seal 394 engageable with the passage 390 to close it. The opposite side of the piston 392 is connected to the outlet line 260 from pump 254 via passage 396. The area of seal 394 exposed to pressure in chamber 382 is small compared to the area of the piston 392 exposed to pump pressure and hence the piston 392 will normally be actuated to hold passage 390 closed keeping the fluid trapped in chamber 382 thereby preventing movement of push through rod 300. In the event of loss of pressure of pump 254, the pressure in chamber 382 as caused by the vehicle operator through rod assembly 250 and spring 298 and the bias of the spring under the valve piston 392 will cause the valve piston 392 to unseat seal 394 permitting the trapped fluid to flow to tank 256 via passage 386 and resulting in push through rod 300 moving to actuate the brakes via fluid passage 380r, valve 282r, and line 274r.

The head portion 380 of rod 300 has a port 398 which cooperates with a cup seal 400 such that upon re-establishment of fluid pressure in the circuit of pump 254, return motion of the push-through rod 300 will result in chamber 384 being filled with fluid in chamber 360 via port 398 and past the lip of the cup seal 400.

Modified fluid separator

FIG. 4A shows a modified form 266r' of fluid separator for the system of FIG. 4. Separator 266r' can be similar to a single cylinder master cylinder and has a piston 265r reciprocably mounted in a housing 267r with one side of piston 265r connected to the controlled fluid pressure via line 264r and with the other side vented to atmosphere via outlet 269r. The piston 265r has a plunger 271r actuable on a piston 273r in a master cylinder like assembly 275r. The piston 273r is normally held deactuated via spring 277r from acting on fluid in chamber 279r which has an outlet connected to ouput line 274r via the valve 282r. A reservoir 281r is connected to chamber 279r as with a conventional master cylinder.

Front brake system

In the discussion of the fluid actuator 25 generally only the rear brake system has been shown and described in FIG. 4 and, while the front brake system has been shown in FIG. 5, only the rear brake system has been described. With regard to the above the front brake system is substantially identical to the rear brake system and generally the description of the rear brake system also would apply to the front system. Where a numeral designation has the letter "r" added this indicates that it applies to the rear brake system and it also denotes that a similar component operating in the same manner is incorporated in the front brake system.

Looking again to FIG. 5, note that the front control valve 252f is connected to the actuating plate 296 and hence the front and rear brakes will be actuated in a similar manner together. However, the spring coupling via spring 352f permits the front control valve 252f to be controllably operated independently of the rear brake control valve 252r and vice versa.

Note that with the system as shown and described an error signal is generated having a magnitude which is generally proportional to the magnitude of the error in wheel acceleration or deceleration relative to desired references and correction and/or modulation is provided in the brake pressure with the magnitude of this correction being generally proportional to the magnitude of the integral of error signal ($\Delta \dot{w}$). Also note that initial control (in mode B) is made to control wheel deceleration with this control being initiated at a wheel deceleration reference which for high $\mu$ surfaces may be less than that magnitude which is indicative of an incipient skid condition. Thus the first correction is made regardless of whether a skid condition exists or not and it is possible to have mode B operation with no subsequent mode A operation. However, one of the significant advantages of mode B is after a mode A operation the pressure will not be applied excessively (i.e., full "on") but rather will be applied to provide the desired controlled deceleration rate, i.e., 3–5g's. For an automotive application, this was attained with the brake pressure modulated to provide pressure relief of around 30% of the applied pressure for an incipient skid condition on a high $\mu$ surface. This contrasts to "on"-"off" type systems in which the brake pressure is almost completely relieved. It should also be noted that the controller 25 generally will provide brake pressure to the brakes which is proportional to the input force as applied by the vehicle operator.

While it will be apparent that the preferred embodiments of the invention disclosed are well calculated to fulfill the objects above stated, it will be appreciated that the invention is suscetpible to modification, variation and change without departing from the proper scope or fair meaning of the invention.

What is claimed is:

1. In a brake system for a wheeled vehicle having brakes actuable by a first fluid and in which the system includes a source of fluid pressure for a second fluid, a controller actuable by the second fluid for controlling the pressure of the first fluid to the brakes of at least one wheel of the vehicle, comprising: a pilot valve having a first variable orifice, a main valve having a second variable orifice, first fluid passage means connecting said pilot valve and said main valve with said main valve being actuated in response to pressure variations at said first variable orifice to provide a corresponding variation of said second variable orifice resulting in an amplification of the pressure variations at the inlet to said main valve, a master cylinder operable with the first fluid, second fluid passage means connecting the output of said master cylinder to the brakes, said second fluid passage means including a blocking valve normally blocking said second fluid passage means and being responsive to loss of pressure at the source for opening said second fluid passage means, linkage means operably connected to said pilot valve for controlling said first variable orifice in response to actuation by the vehicle operator, said linkage means including a push-through rod connected to receive the force of the vehicle operator during brake application and connected to said master cylinder, and a fluid chamber having trapped said second fluid operable on said push-through rod to hold off said push-through rod from acting on said master cylinder, said fluid chamber including a valve member responsive to a loss of pressure at the source for opening said fluid chamber and permitting said push-through rod to act on said master cylinder.

2. In a brake system for a wheeled vehicle having brakes in which the system includes a source of fluid pressure a controller actuable for controlling the pressure to at least one wheel of the vehicle, comprising: a first pilot valve having a first variable orifice, a first main valve having a second variable orifice, first fluid passage means connected said first pilot valve and said first main valve with said first main valve being actuated in response to pressure variation at said first variable orifice to provide a corresponding variation of said second variable orifice resulting in an amplification of the pressure variation at the inlet to said main valve, said first pilot valve comprising electromagnet motor means for varying said first orifice in response to an electrical control signal, said motor means comprising a spool member having a coil wound thereon with said spool member having a restriction surface for controlling said first orifice, linkage means operably connected to said spool member via a resilient connection and being operable by the vehicle operator for varying said first variable orifice, said spool member being movable independently of said linkage means in response to said control signal to said electromagnet motor means.

3. The brake system of claim 2 with said first pilot valve and said main valve operable to control the pressure to one brake for one wheel and further including a second pilot valve, similar to said first pilot valve, and second main valve, similar to said first main valve for controlling pressure to the brakes for a second wheel, said linkage means including a common actuating plate connected to said spool member for each said first and second pilot valve.

4. The brake system of claim 3 with said first and second pilot valves being supported on a common housing and having a common return to the source.

5. The brake system of claim 4 with said spool member for each said first and second pilot valve being resiliently urged relative to said actuating plate to close the associated said first variable orifice.

6. The brake system of claim 5 with said first and second pilot valves being located at positions laterally spaced from the center of said actuating plate.

7. The brake system of claim 3 with said spool member for each said first and second pilot valve being resiliently urged relative to said actuating plate to close the associated said first variable orifice.

8. The brake system of claim 7 with said first and second pilot valves being located at positions laterally spaced from the center of said actuating plate.

9. In a brake system for a wheeled vehicle having brakes actuable by a first fluid and in which the system includes a source of fluid pressure for a second fluid, a controller actuable by the second fluid for controlling the pressure of the first fluid to the brakes of at least one wheel of the vehicle, comprising: a pilot valve having a first variable orifice, a main valve having a second variable orifice, first fluid passage means connecting said pilot valve and said main valve with said main valve being actuated in response to pressure variations at said first variable orifice to provide a corresponding variation of said second variable orifice resulting in an amplification of the pressure variations at the inlet to said main valve, master cylinder means having an output portion operable with the first fluid and an input portion operable with the second fluid and connected to said main valve and responsive to the amplified output pressure at said main valve for providing corresponding variations in pressure on the first fluid at said output portion, second fluid passage connecting said output portion of said master cylinder means to the brakes.

10. The brake system of claim 9 further comprising a master cylinder operable with the first fluid, third fluid passage means connecting the output of said master cylinder to the brakes, said third fluid passage means including a blocking valve normally blocking said third fluid passage means and being responsive to loss of pressure at the source for opening said second fluid passage means.

11. The brake system of claim 10 further comprising linkage means operably connected to said pilot valve for controlling said first variable orifice in response to actuation by the vehicle operator, said linkage means including a push-through rod connected to receive the force of the vehicle operator during brake application and connected to said master cylinder, hold-off means for normally preventing said push-through rod from acting on said master cylinder and including a valve member responsive to a loss of pressure at the source for permitting said push-through rod to act on said master cylinder.

12. A fluid amplifier operable from a source of fluid pressure for a wheeled vehicle brake system comprising a pilot valve having a first variable orifice, a main valve having a second variable orifice providing pressure variations for the brake of at least one wheel of said wheeled vehicle, fluid passage means communicating the source with said first variable orifice of said pilot valve and with said second variable orifice of said main valve, said pilot valve including a first movable member operable by the vehicle operator for varying the restriction of said first variable orifice, said main valve including a second movable member operable for varying the restriction of said second variable orifice, said fluid passage means including a fluid path through said second movable member.

13. The amplifier of claim 12 with said movable member being mounted for reciprocation in a chamber with one side of said second movable member being located to have one side acted on by the pressure at said second variable orifice and the other side acted on by the pressure at said first variable orifice.

14. The amplifier of claim 13 with said other side of said second movable member being communicated with said first variable orifice via said fluid path and a connecting passageway.

15. The amplifier of claim 14 with said first movable member being connected to a spring member and being selectively actuable through said spring member.

16. A fluid amplifier operable from a source of fluid pressure for use on a brake system for at least one wheel of a wheeled vehicle comprising: linkage means for actuation by the vehicle operator, a pilot valve having a first variable orifice, a main valve having a second variable orifice, fluid passage means communicating the source with said first variable orifice of said pilot valve and with said second variable orifice of said main valve, said pilot valve including a first movable member operable for varying the restriction of said first variable orifice, said first movable member being connected to a spring member and being selectively actuable through said spring member, said spring member being connected to said linkage means for actuation of said first movable member by the vehicle operator, said main valve including a second movable member operable for varying the restriction of said second variable orifice, said second movable member being mounted for reciprocation in a chamber with one side of said second movable member being located to have one side acted on by the pressure at said second variable orifice and the other side being communicated with said first variable orifice via said fluid path and a connecting passageway to be acted on by the pressure at said first variable orifice, said fluid passage means including a fluid path through said second movable member.

17. The apparatus of claim 16 with the brake system including electromagnet means for controlling said pilot valve independently of the vehicle operator and in accordance with the magnitude of the current to said electromagnet means.

18. The apparatus of claim 17 with said electromagnet means including a fixed magnet assembly and a coil assembly supported upon said first movable member whereby said first movable member will be moved in response to current to said coil assembly.

19. The apparatus of claim 17 with said coil assembly being adapted to receive its current from a skid control circuit whereby skid control operation of the brakes can be effectuated.

References Cited

UNITED STATES PATENTS

| | | | |
|---|---|---|---|
| 3,524,683 | 8/1970 | Stelzer | 303—21 F |
| 3,401,982 | 9/1968 | Walker et al. | 303—21 F |
| 3,503,655 | 3/1970 | Heimler | 303—21 F |
| 3,532,394 | 10/1970 | Goddard | 303—21 F |
| 3,539,227 | 11/1970 | Drutchas et al. | 303—21 F |
| 3,556,608 | 1/1971 | MacDuff et al. | 303—21 F |

MILTON BUCHLER, Primary Examiner

S. G. KUNIN, Assistant Examiner

U.S. Cl. X.R.

137—613; 303—10, 63